US008208616B2

(12) United States Patent
Sastry

(10) Patent No.: US 8,208,616 B2
(45) Date of Patent: Jun. 26, 2012

(54) CONFERENCE-CALL SYSTEM AND CONFERENCE-SPECIFIC ACCESS CODES

(75) Inventor: Sathyanarayana Venkatasubba Sastry, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 12/362,036

(22) Filed: Jan. 29, 2009

(65) Prior Publication Data

US 2010/0189244 A1  Jul. 29, 2010

(51) Int. Cl.
  *H04M 3/56* (2006.01)
  *H04N 7/15* (2006.01)
  *H04L 12/18* (2006.01)
  *G06F 15/16* (2006.01)
(52) U.S. Cl. ............... 379/202.01; 348/14.08; 370/260; 370/261; 370/262; 379/203.01; 455/416; 709/204
(58) Field of Classification Search .......... 370/260–262; 379/202.01–206.01; 348/14.08–14.1; 455/416; 709/204, 205
See application file for complete search history.

(56) References Cited

U.S. PATENT DOCUMENTS

| 7,324,636 | B2 | 1/2008 | Sauvage et al. |
| 7,328,343 | B2 * | 2/2008 | Caronni ........................ 713/171 |
| 7,412,050 | B2 * | 8/2008 | Renner et al. ............ 379/215.01 |
| 2001/0046284 | A1 | 11/2001 | Alcott |
| 2004/0141605 | A1 | 7/2004 | Chen et al. |
| 2004/0170265 | A1 | 9/2004 | Benco et al. |
| 2008/0037751 | A1 | 2/2008 | Aldrey et al. |
| 2008/0095339 | A1 | 4/2008 | Elliott et al. |

FOREIGN PATENT DOCUMENTS

WO   WO2005034483 A2   4/2005

OTHER PUBLICATIONS

PCT Search Report~International Application No. PCT/US2010/022393~International Filing Date Jan. 28, 2010~Date of Mailing Aug. 31, 2010.

* cited by examiner

*Primary Examiner* — Harry Hong

(57) ABSTRACT

A conference-call system receives a conference-specific access code from an invited participant of a conference call and a conference-specific access code from an initiator of the conference call. The conference-call system grants the invited participant access to the conference call when the conference-specific access code from the invited participant matches the conference-specific access code from the initiator. The conference-specific access code from the initiator and the invited participant each include a base code portion and a portion added to the base code portion by the initiator of the conference call.

20 Claims, 4 Drawing Sheets

CONFERENCE-CALL SYSTEM AND CONFERENCE-SPECIFIC ACCESS CODES

BACKGROUND

Conference calls (e.g., teleconferences) typically involve three or more participants communicating with each other at the same time. A participant typically enters a conference call by calling a conference system (e.g., sometimes referred to as a conference bridge). The conference system usually responds to the call by prompting the participant for an access code. The conference system then grants the participant access to the conference call in response to receiving and verifying the access code.

One problem with existing conference systems is that existing access codes are usually the same for all conferences organized by the same conference initiator using the same service provider. This means that a participant can access any conference organized by that conference initiator, regardless of whether that participant is invited to a conference. This is undesirable in that an uninvited participant may have access to confidential conferences.

Another problem with existing conference systems is that participants often attempt to access a conference by entering the access code prior to the start of the conference and are put on "hold" until the conference starts. However, the conference initiator and sometimes the participants are charged for the time while participants are on "hold."

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
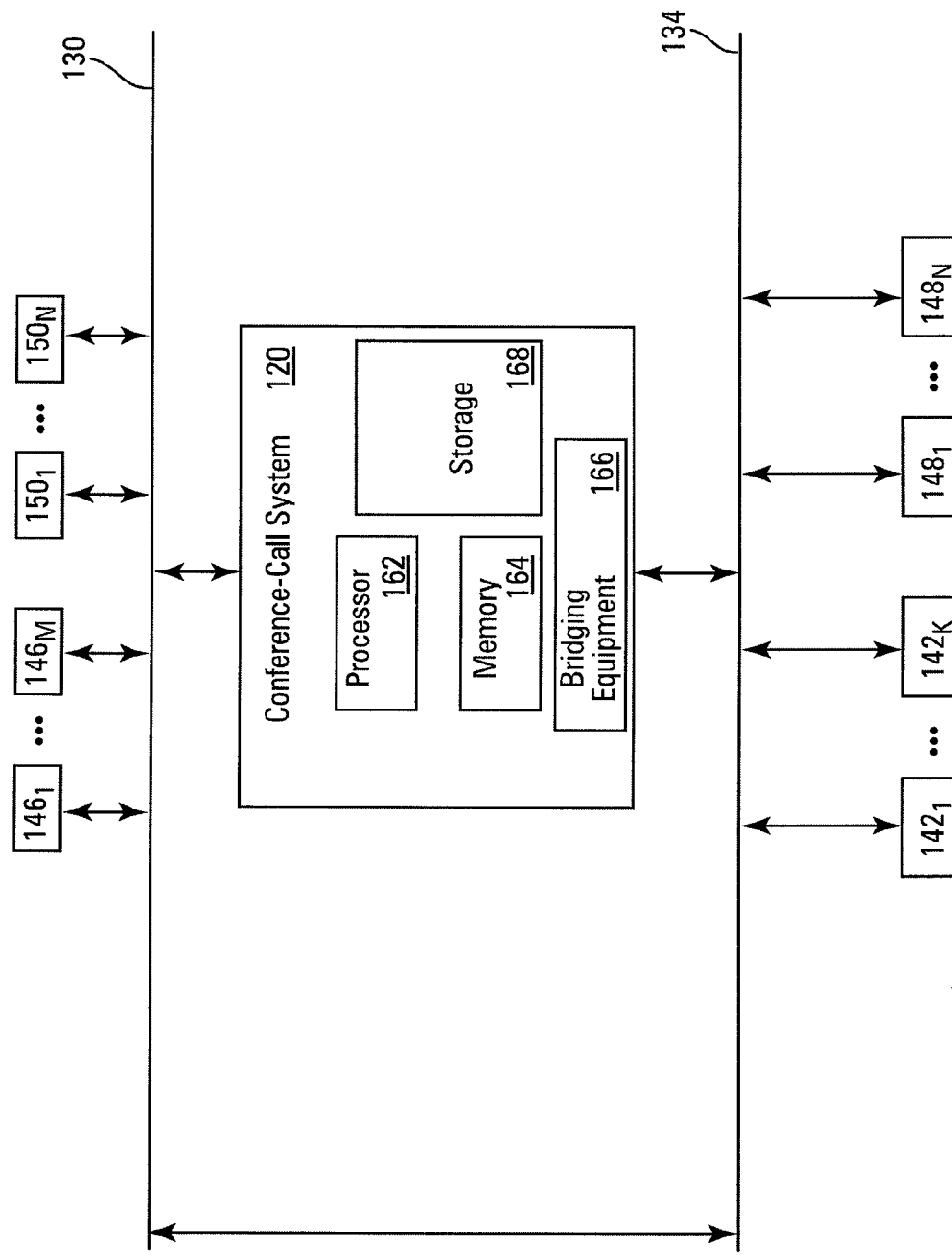
FIG. 1 is a block diagram of an embodiment of a conferencing network, according to an embodiment of the disclosure.

FIG. 1 is a block diagram of a conferencing network 100 for facilitating conference calls, such as audio conference calls, between a plurality of terminal devices of a plurality of participants. A conference-call system 120 (e.g., a conference-call server) is coupled to the Internet 130. For example, conference-call system 120 may be an audio-conference-call system. Conference-call system 120 is further coupled to a communication network 134, such as the public switched telephone network (PSTN), that is also coupled to the Internet 130.

The plurality of terminal devices can include mobile (e.g., cellular) telephones 142 (e.g., mobile telephones $142_1$ to $142_K$), personal computers 146 (e.g., personal computers $146_1$ to $146_M$), and plain-old-telephone-service-type (POTS-type) telephones 148 (e.g., POTS-type telephones $148_1$ to $148_N$). Mobile telephones 142 are wirelessly coupled to communication network 134 and are thus coupled to conference-call system 120 and the Internet 130 via communication network 134. Mobile telephones 142 are configured to communicate with conference-call system 120 and can send and receive email via the Internet 130.

Personal computers 146 are coupled (e.g., either wirelessly or hard coupled) to the Internet 130 and are thus coupled to conference-call system 120 and communication network 134 via the Internet 130. Alternatively, personal computers 146 may be coupled to the Internet 130 through communication network 134. Personal computers 146 are configured to make calls to other terminal devices via the Internet 130 and communication network 134. Plain-old-telephone-service-type (POTS-type) telephones 148 are coupled to communication network 134, e.g., via POTS-type link, and thus to conference-call system 120, via telephone network 134. Each conference participant, including a conference initiator (e.g., a participant who initiates the conference call), may use any one of the terminal devices to participate in a conference call.

Computers 150 (e.g., computers $150_1$ to $150_N$) are also coupled to the Internet 130. Alternatively, personal computers 150 may be coupled to the Internet 130 through communication network 134. For one embodiment, computers 150 are used in conjunction with POTS-type telephones 148. For example, a conference participant using a POTS-type telephone 148 may receive a conference access code and a conference contact code (e.g., conference telephone number) from a computer 150 for input into a POTS-type telephone 148. A conference participant who is also the conference initiator and who also uses a POTS-type telephone 148 may also use a computer 150 to request a meeting from conference-call system 120 and then use the POTS-type telephone 148 to initiate and to participate in the conference. Computers 150 can be considered to be terminal devices that are not used by a participant during an actual conference.

Conference-call system 120 may include a processor 162 for processing computer-readable instructions. These computer-readable instructions are stored in a memory 164, such as a computer-usable medium, and may be in the form of software, firmware, hardware, or a combination thereof. The computer-readable instructions configure memory 164 to allow conference-call system 120 to perform various methods, such as described below in conjunction with various embodiments of the invention.

In a hardware solution, the computer-readable instructions are hard coded as part of processor 162, e.g., an application-specific integrated circuit (ASIC) chip. In a software or firmware solution, the instructions are stored for retrieval by the processor 162. Some additional examples of computer-usable media include static or dynamic random access memory (SRAM or DRAM), read-only memory (ROM), electrically erasable programmable ROM (EEPROM or flash memory), magnetic media and optical media, whether permanent or removable. Most consumer-oriented computer applications are software solutions provided to the user on some form of removable computer-usable media, such as a compact disc read-only memory (CD-ROM) or digital video disc (DVD).

Conference-call system 120 may include bridging equipment 166 that is used to couple the terminal devices to each other during a conference call. As such, conference-call system 120 may be referred to as a conference bridge. Conference-call system 120 may be administered by a service provider.

The conference initiator may register or create conference-call account, e.g., with conference-call system 120. For example, the initiator may register for a conference-call account via a mobile telephone 142, a personal computer 146, or a personal computer 150. When the initiator registers for a conference-call account, the initiator is provided with a conference-initiation code, a conference base code, and a conference contact number, such as a conference telephone number. Note that conference-call system 120 may be configured to send the conference-initiation code (e.g., also referred to as an initiator's access code), the conference base code (e.g., also referred to as a participant's access code), and the conference contact number to the initiator when the initiator creates the conference-call account.

The conference base code is unique to the conference initiator and is common to all of the conference calls initiated by the conference initiator for a given account. The conference base code may be an alpha and/or numeric code that uniquely identifies the conference initiator.

For one embodiment, the conference initiator creates a conference-specific access code by adding a conference-specific code to the conference base code. That is, the conference-specific access code includes a first portion corresponding to the conference base code and a second portion corresponding to the conference-specific code. For one embodiment, the conference initiator creates the conference specific code. The conference-specific code is different for different conferences initiated by the same conference initiator. For example, the conference-specific code could be unique with respect to all conferences or could be unique for the conferences on a given day, where the conference-specific code is a time only code.

The conference initiator then sends the conference-specific access code thus created and the conference telephone number to each of the invited participants. For example, the conference initiator may email the conference-specific access code to the terminal devices of the participants capable of receiving email, such as one or more of mobile telephones 142 and one or more of personal computers 146. Where participants use POTS-type telephones 148, the conference-specific access code may be emailed to computers 150 of those participants. Alternatively, the conference-specific access code may be sent to a voice mail system for POTS-type telephones 148 and mobile telephones 142 or text messaged to mobile telephones 142.

Figure 2:
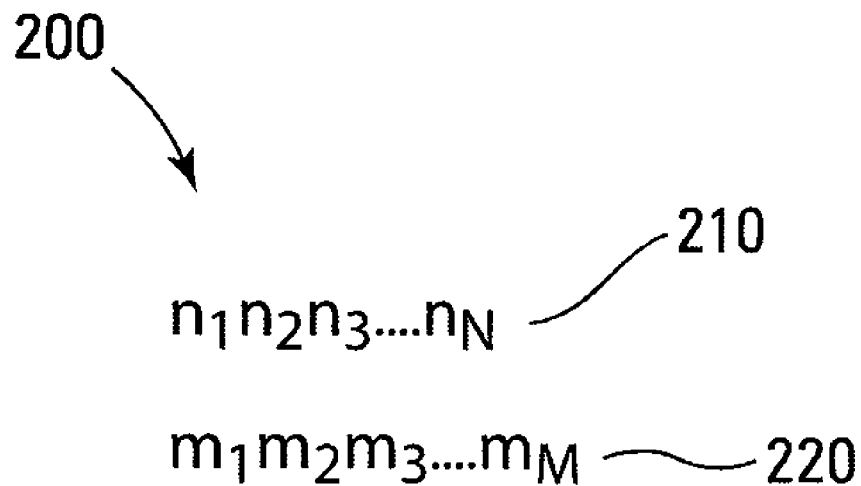
FIG. 2 illustrates an embodiment of a conference-specific access code having separate portions, according to another embodiment of the disclosure.

For one embodiment, the conference base code portion and the conference-specific code portion are sent separately to each of the invited participants. For example, FIG. 2 illustrates a conference-specific access code 200 having a separate base code portion 210 and a separate conference-specific code portion 220, where each of the characters $n_1$ to $n_N$ and each of the characters $m_1$ to $m_M$ may be alpha or numeric characters and N and M are integers. The numerical value of integer N may be greater than, equal to, or less than the numerical value of the integer M. Note that conference-specific code portion 220 is added by the initiator so that conference-specific access code 200 uniquely specifies a particular conference. For one embodiment, conference-specific code portion 220 may include the date of the conference and a nominal start time of the conference. Alternatively, conference-specific code portion 220 may be only a time of day.

Figure 3:
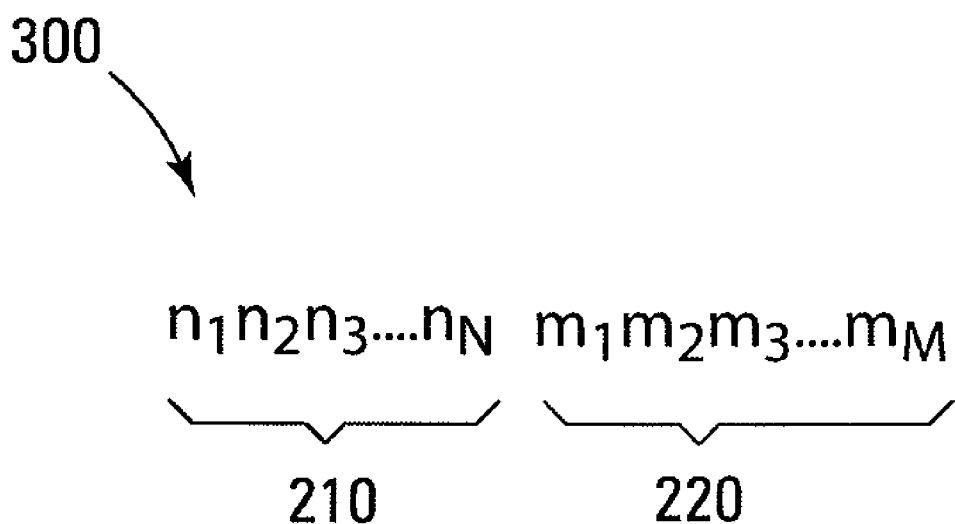
FIG. 3 illustrates an embodiment of a conference-specific access code as a single entity, according to another embodiment of the disclosure.

Alternatively, the conference-specific access code may be sent to each of the invited participants as a single code. For example, FIG. 3 illustrates base code portion 210 and conference-specific code portion 220 of FIG. 2 integrated into a single conference-specific access code 300. Although, conference-specific code portion 220 is shown as a suffix to base code portion 210 in conference-specific access code 300, conference-specific code portion 220 can be a prefix to base code portion 210 for other embodiments.

For one embodiment, conference-call system 120 is configured to differentiate between the base code portion 210 and the conference-specific code portion 220 of conference-specific access code 300. For example, conference-call system 120 may be configured to take the first N characters of conference-specific access code 300 to be the base code portion 210 and the remaining M characters of conference-specific access code 300 to be the conference-specific code portion 220.

A caller (each invited participant or the conference initiator) connects to conference-call system 120 by calling conference-call system 120 from a terminal device to be used during the conference, e.g., by inputting the conference telephone number into the terminal device. Conference-call system 120 prompts the caller to input the conference-specific access code and to indicate whether the respective caller is an invited participant or is the conference initiator. Conference-call system 120 may prompt the caller to indicate whether the respective caller is an invited participant or is the conference initiator in response to receiving the conference-specific access code. When the caller is identified as the conference initiator, conference-call system 120 prompts the conference initiator for the the conference-initiation code. Conference-call system 120 opens the conference in response to receiving the conference-initiation code and the conference-specific access code from the terminal device of the conference initiator.

Note that the conference initiator can open a conference at any time by merely entering the conference-initiation code and the conference-specific access code. As such conference-call system 120 may be referred to a reservationless in that conference-call system 120 does not require the initiator to schedule a particular time for the conference.

Where the base code and the conference-specific code are separate codes, conference-call system 120 may prompt each invited participant to input the base code first and then prompt each invited participant to input the conference-specific code second. As such, conference-call system 120 receives the base code and the conference-specific code separately from the invited participant. Similarly, conference-call system 120 may prompt the initiator to input the base code first and then prompt the initiator to input the conference-specific code second. As such, conference-call system 120 receives the base code and the conference-specific code separately from the initiator. Where the base code and the conference-specific code are integrated to form a single conference-specific access code, conference-call system 120 receives the base code and the conference-specific code in combination as a single entity in the form of the conference-specific access code.

Figure 4:
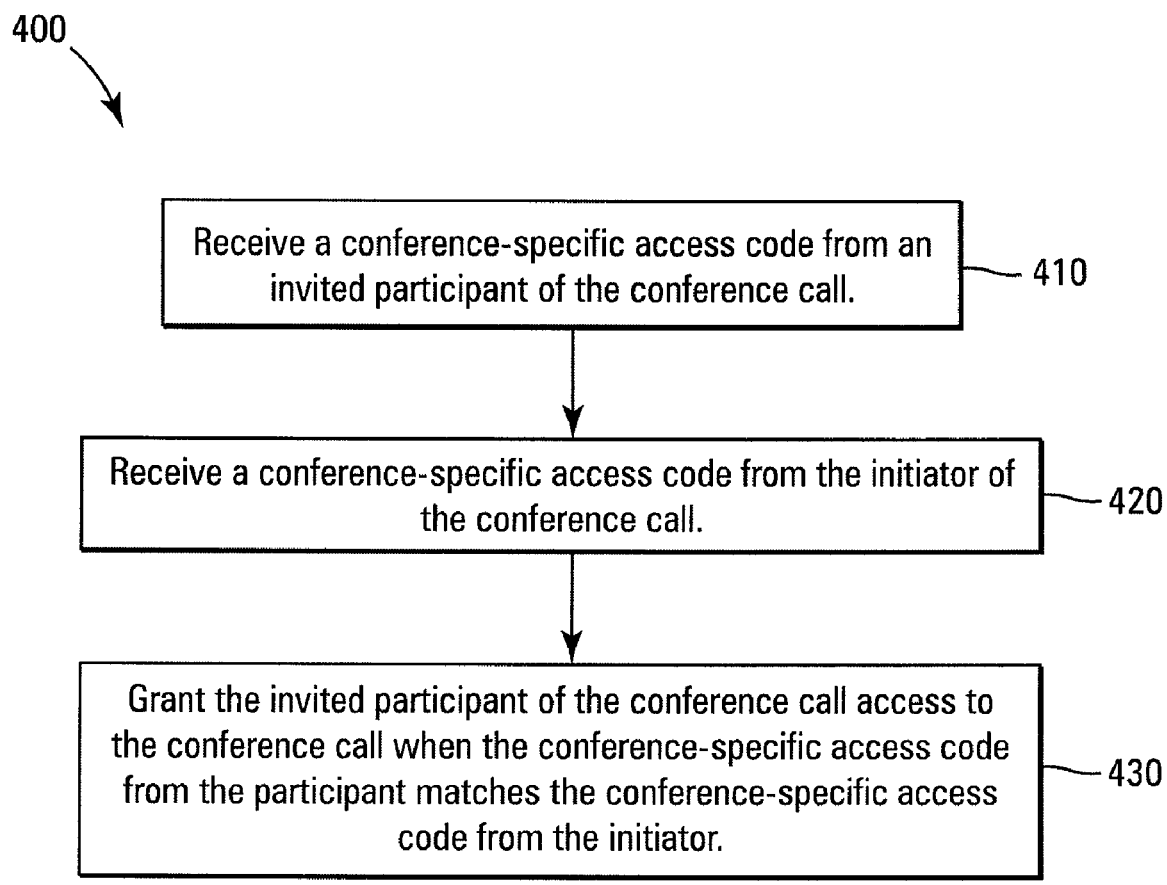
FIG. 4 is a flowchart of an embodiment of a method performed by a conference-call system, according to another embodiment of the disclosure.

For one embodiment, the computer-readable instructions configure memory 164 of conference-call system 120 to allow conference-call system 120 to perform a method 400, as illustrated by the flowchart in FIG. 4. At block 410, conference-call system 120 receives a conference-specific access code from an invited participant of a conference call. At block 420, conference-call system 120 receives a conference-specific access code from the initiator of the conference call. At block 430, conference-call system 120 grants the invited participant of the conference call access to the conference call when the conference-specific access code from the participant matches the conference-specific access code from the initiator. Note that each conference-specific access code has a base code portion and a portion, i.e., the conference-specific code portion, added to the base code portion by the initiator of the conference call.

Note that conference-call system 120 grants the invited participant of the conference call access to the conference call after conference-call system 120 has opened the conference call in response receiving both the second conference-specific access code and the conference-initiation code from the initiator. That is, conference-call system 120 grants the invited participant of the conference access to the conference call after receiving both the conference-specific access code and the conference-initiation code from the initiator.

Conference-call system 120 may store the conference-specific access code from the initiator in response to the initiator opening the conference-call. For example, the conference-specific access code may be stored in a storage device 168, such as a hard drive, removable flash memory, etc. Conference-call system 120, then searches storage device 168 for the conference-specific access code from the initiator in response to receiving the conference-specific access code from the invited participant. When the conference-specific access code from the invited participant matches the conference-specific access code in storage device 168, the invited participant is granted access to the conference call.

For another embodiment, conference-call system 120 may store the base code and conference-specific code portions of the conference-specific access code from the initiator separately. For this embodiment, conference-call system 120 then compares the base code portion of the conference-specific access code from the invited participant to the stored base code portion of the conference-specific access code from the initiator and the conference-specific code portion of the conference-specific access code from the participant to the stored conference-specific code portion of the conference-specific access code from the initiator. Note that this can be accomplished regardless of whether the initiator and invited participant enter the base code and conference-specific code portions separately or as a single code in that conference-call system 120 is capable of distinguishing between the base code and conference-specific code portions when input as a single code, as discussed above in conjunction with conference-specific access code 300 of FIG. 3.

Figure 5:
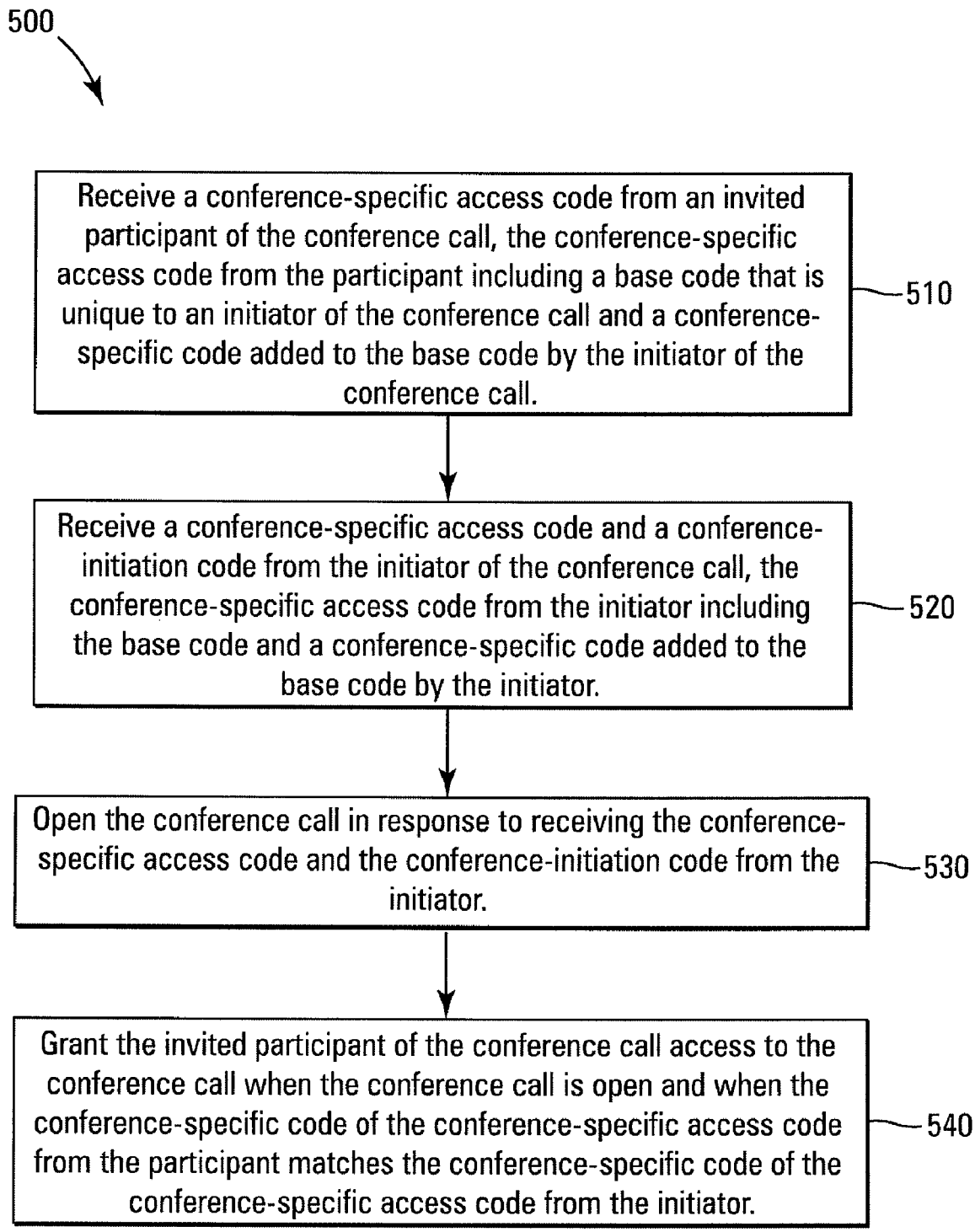
FIG. 5 is a flowchart of another embodiment of a method performed by a conference-call system, according to another embodiment of the disclosure.

For another embodiment, the computer-readable instructions configure memory 164 of conference-call system 120 to allow conference-call system 120 to perform a method 500, as illustrated by the flowchart in FIG. 5. At block 510, conference-call system 120 receives a conference-specific access code from an invited participant of the conference call, where the conference-specific access code includes a base code that is unique to an initiator of the conference call and a conference-specific code added to the base code by the initiator of the conference call. At block 520, conference-call system 120 receives a conference-specific access code and a conference-initiation code from the initiator of the conference call, where the conference-specific access code from the initiator includes the base code and a conference-specific code added to the base code by the conference initiator. At block 530, conference-call system 120 opens the conference call in response to receiving the conference-specific access code and the conference-initiation code from the initiator of the conference call. At block 540, conference-call system 120 grants the invited participant of the conference call access to the conference call when the conference call is open and when the conference-specific code of the conference-specific access code from the participant matches the conference-specific code of the conference-specific access code from the initiator. Conference-call system 120 may further send the base code and the conference-initiation code to the initiator of the conference call before receiving the conference-specific access codes from the initiator and the invited participant and before receiving the conference-initiation code, when the conference initiator registers for a conference-call account.

Methods 400 and 500 avoid the problems associated with assigning a single access code to more than one conference and granting access to more than one conference in response to that single access code, as is commonly done. In particular, granting access to more than one conference using a single access code allows participants to access conferences to which they are not invited. Using the conference-specific access codes avoids this problem.

Note that having the conference initiator add a conference-specific code, such as a simple date/time code or the like, to the base code to create a conference-specific access code avoids the need for a cyptographically created unique conference-specific access code for each conference initiated by the conference initiator.

When an invited participant connects to conference-call system 120 before the initiator has opened the conference, conference-call system 120 is not able to match the conference-specific access code entered by the invited participant to the conference-specific access code from the initiator, as the conference-specific access code has yet to be entered by the initiator. When this occurs, conference-call system 120 may indicate that the meeting has not yet started and may disconnect the invited participant from conference-call system 120 or may have the invited participant wait until the conference is opened by placing the invited participant on "hold." When the invited participant is on "hold" for a certain amount of time (e.g., about 5 minutes) without the conference call being opened, conference-call system 120 may instruct the participant to call back later and then disconnect the invited participant. Alternatively, when the invited participant is on "hold" for the certain amount of time without the conference call being opened, conference-call system 120 may provide the invited participant with the option of continuing to hold or to disconnect and call back later.

For another embodiment, when an invited participant connects to conference-call system 120 before the initiator has opened the conference, conference-call system 120 may present various options to the invited participant. One such option may a "hold" option, which when selected by the invited participant places the invited participant on "hold" until the initiator opens the conference call. Another option may be a "disconnect" option that when selected by the invited participant disconnects the invited participant's terminal device from conference-call system 120. Another option may be a "call back" option.

The conference-call system 120 may instruct the invited participant to enter a specific number (e.g., a one) into the terminal device used for the conference to select the "hold" option, another specific number (e.g., a two) to select the "disconnect" option, and another specific number (e.g., a three) to select the "call back" option. For one embodiment, if the invited participant fails to select an option within a certain amount of time (e.g., about 15 seconds) and the conference call is not yet opened, conference-call system 120 disconnects the invited participant.

The "call back" option provides for a notification to be sent from conference-call system 120 to the invited participant. The notification indicates that the conference initiator has opened the conference and that the conference has started.

In response to the invited participant selecting the "call back" option, conference-call system 120 may prompt the invited participant to elect a format in which the notification is to be sent. For example, participant might elect to have conference-call system 120 send the notification in as an email, page, text message, voice message, etc. Conference-call system 120 may also prompt the invited participant to input a contact code, such as an email address, pager number, telephone number, etc., of a device to which the notification is to be sent. Conference-call system 120 then disconnects the invited participant in response to the invited participant inputting the contact code into the terminal device to be used by the invited participant for the conference.

The device to which the notification is to be sent may be the terminal device to be used by the invited participant during the conference call. For example, the email might be sent to a personal computer to be used by the invited participant during the conference call, such as a computer 146, or the text message or voice message might be sent to a mobile telephone to be used by the invited participant during the conference call, such as a mobile telephone 142. The voice message may be sent to a POTS-type telephone to be used by the invited participant during the conference call, such as a POTS-type telephone 148. The page is sent to a pager of the invited participant, and the invited participant may respond to the page using a terminal device to be used during the conference, such as a mobile telephone 142, a computer 146, or a POTS-type telephone 148.

Where the notification is sent in the form of a voice message, text message, or email, the notification may indicate that the conference has started and/or may instruct the invited participant to call into the conference. Where the notification is sent in the form of a page, the notification may be a numeric page that corresponds to a contact code of conference-call system 120. Alternatively, the page may include text indicating that the conference has started and/or instructing the invited participant to call into the conference.

Upon opening the conference, conference-call system 120 sends the notification to those invited participants who registered for the notification. For example, conference-call system 120 may send the notification in response to receiving the conference-initiation code and the conference-specific access code from the terminal device of the conference initiator. Upon receiving the notification, the invited participants who registered for the notification call into the conference from their respective terminal devices. In response to receiving the call from those participants, the conference-call system 120 may prompt those participants to re-enter the conference-specific access codes to gain access to the conference. Conference-call system 120 then grants access to these participants in response to re-entry of their conference-specific access codes.

Disconnecting an invited participant who connects to a conference system before the start of a conference call acts to reduce the amount of time the invited participant spends on "hold" while waiting for the start of the conference, as is commonly done. This acts to reduce the costs in that the conference initiator and sometimes the invited participants are charged for the time while invited participants are on "hold."

In addition, providing the option to invited participants of receiving notification of the start of the conference so that the invited participants can join the conference when the conference opens acts to reduce costs associated with the common practice of keeping invited participants on "hold" until a conference is opened.

CONCLUSION

Although specific embodiments have been illustrated and described herein it is manifestly intended that the scope of the claimed subject matter be limited only by the following claims and equivalents thereof.

What is claimed is:

1. A conference-call system, comprising:
   a processor configured to process computer-readable instructions; and
   a computer-readable memory configured to store the computer-readable instructions, wherein the computer-readable instructions configure the computer-readable memory to allow conference-call system to perform a method comprising:
      receiving a first conference-specific access code from an invited participant of a conference call;
      receiving a second conference-specific access code from an initiator of the conference call; and
      granting the invited participant of the conference call access to the conference call when the first conference-specific access code matches the second conference-specific access code;
      wherein the first and second conference-specific access codes each comprise a base code portion and a portion added to the base code portion by the initiator of the conference call.

2. The conference-call system of claim 1, wherein the computer-readable memory is further configured to allow the conference-call system to perform the step of searching for the second conference-specific access code in response to receiving the first conference-specific access code.

3. The conference-call system of claim 1, wherein the base code portion and the portion added to the base code portion of each of the first and second conference-specific access codes are received separately.

4. The conference-call system of claim 1, wherein the base code portion and the portion added to the base code portion of each of the first and second conference-specific access codes are received in combination as a single entity.

5. The conference-call system of claim 1, wherein the portion added to the base code portion includes a date and a time.

6. The conference-call system of claim 1, wherein the computer-readable memory is further configured to allow the conference-call system to perform the step of opening the conference call before granting the invited participant of the conference call access to the conference call.

7. The conference-call system of claim 6, wherein the computer-readable memory is further configured to allow the conference-call system to perform the step of opening the conference call in response to receiving a conference-initiation code from the initiator of the conference call and receiving the second conference-specific access code from the initiator.

8. The conference-call system of claim 6, wherein when the conference-call system receives the first conference-specific access code from the invited participant before the conference-call system performs the step of opening the conference call, the computer-readable memory is further configured to allow the conference-call system to perform the step of disconnecting the invited participant from the conference-call system or the steps of placing the invited participant on "hold" and disconnecting the invited participant when the participant is on "hold" for a certain amount of time without the conference call being opened.

9. The conference-call system of claim 6, wherein when the conference-call system receives the first conference-specific access code from the invited participant before the conference-call system performs the step of opening the conference call, the computer-readable memory is further configured to allow the conference-call system to perform the step of prompting the invited participant to select an option of waiting for the conference-call system to perform the step of opening the conference call, an option of disconnecting from the conference-call system, or an option of receiving a notification from the conference-call system indicating that the conference call is open.

10. The conference-call system of claim 9, wherein before the conference-call system performs the step of opening the conference call and when the invited participant fails to select an option within a certain amount of time, the computer-readable memory is further configured to allow the conference-call system to perform the step of disconnecting the invited participant from the conference-call system.

11. The conference-call system of claim 9, wherein the computer-readable memory is further configured to allow the conference-call system to perform the step of prompting the invited participant to input a contact code of a device of the invited participant for receiving the notification in response to the invited participant selecting the option of receiving the notification.

12. The conference-call system of claim 11, wherein the computer-readable memory is further configured to allow the conference-call system to perform the step of sending the notification to the device of the invited participant upon opening the conference call.

13. A conference-call system, comprising:
a processor configured to process computer-readable instructions; and
a computer-readable memory configured to store the computer-readable instructions, wherein the computer-readable instructions configure the computer-readable memory to allow conference-call system to perform a method comprising:
receiving a first conference-specific access code from an invited participant of the conference call, the first conference-specific access code comprising a base code that is unique to an initiator of the conference call and a conference-specific code added to the base code by the initiator of the conference call;
receiving a second conference-specific access code and a conference-initiation code from the initiator of the conference call, the second conference-specific access code comprising the base code and a conference-specific code added to the base code by the conference initiator;
opening the conference call in response to receiving the second conference-specific access code and the conference-initiation code from the initiator of the conference call;
granting the invited participant of the conference call access to the conference call when the conference call is open and when the conference-specific code of the first conference-specific access code matches the conference-specific code of the second conference-specific access code.

14. The conference-call system of claim 13, wherein the conference-specific code of each of the first and second conference-specific access codes includes a date and a time.

15. The conference-call system of claim 13, wherein the computer-readable memory is further configured to allow the conference-call system to perform the step of sending the base code and the conference-initiation code to the initiator of the conference call before receiving the first and second conference-specific access codes and before receiving the conference-initiation code.

16. A method of operating a conference-call system, comprising:
receiving a first conference-specific access code from a terminal device of an invited participant of a conference call;
receiving a second conference-specific access code and a conference-initiation code from a terminal device of an initiator of the conference call;
opening the conference call in response to receiving the second conference-specific access code and the conference-initiation code from the terminal device of the initiator of the conference call;
granting the terminal device of the invited participant of the conference call access to the conference call when the first conference-specific access code matches the second conference-specific access code and when the conference call is open; and
coupling the terminal device of the invited participant to the terminal device of the initiator using bridging equipment of the conference-call system;
wherein the first and second conference-specific access codes each comprise a base code portion and a portion added to the base code portion by the initiator of the conference call.

17. The method of claim 16, wherein the portion added to the base code portion by the initiator of the conference call includes a date of the conference call and a time of the conference call.

18. The method of claim 16, further comprising when the conference-call system receives the first conference-specific access code from the terminal device of the invited participant before opening the conference call, disconnecting the terminal device of the invited participant from the conference-call system or placing the terminal device of the invited participant on "hold" and disconnecting the terminal device of the invited participant when the terminal device of the participant is on "hold" for a certain amount of time without the conference call being opened.

19. The method of claim 16, further comprising when the conference-call system receives the first conference-specific access code from the terminal device of the invited participant before opening the conference call, prompting the invited participant to select an option of waiting for the conference call to open, an option of disconnecting from the conference-call system, or an option of receiving a notification from the conference-call system indicating that the conference call is open.

20. The method of claim 19, further comprising when the invited participant selects the option of receiving the notification, sending the notification to the terminal device of the invited participant upon opening the conference call.

* * * * *